(12) United States Patent
Liu et al.

(10) Patent No.: US 8,569,931 B2
(45) Date of Patent: Oct. 29, 2013

(54) PIEZOELECTRIC VIBRATOR AND ELECTRONIC DEVICE USING SAME

(75) Inventors: Lin Liu, Shenzhen (CN); Jie He, Shenzhen (CN); Huan-Tang Li, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 0 days.

(21) Appl. No.: 12/978,575

(22) Filed: Dec. 26, 2010

(65) Prior Publication Data

US 2011/0241489 A1     Oct. 6, 2011

(30) Foreign Application Priority Data

Apr. 6, 2010   (CN) .......................... 2010 2 0156812

(51) Int. Cl.
*H01L 41/053*    (2006.01)

(52) U.S. Cl.
USPC ............................. 310/328; 310/318; 310/324

(58) Field of Classification Search
CPC ............................ H04R 17/00; H01L 41/083
USPC .................................. 310/328, 317, 318, 324
See application file for complete search history.

(56) References Cited

U.S. PATENT DOCUMENTS

| | | | |
|---|---|---|---|
| 7,554,246 B2 * | 6/2009 | Maruyama et al. | 310/338 |
| 2006/0192657 A1 * | 8/2006 | Nishimura et al. | 340/407.2 |
| 2009/0002199 A1 * | 1/2009 | Lainonen et al. | 341/20 |
| 2009/0072662 A1 * | 3/2009 | Sadler et al. | 310/319 |
| 2009/0135142 A1 * | 5/2009 | Fu et al. | 345/168 |

* cited by examiner

*Primary Examiner* — Derek Rosenau
*Assistant Examiner* — Bryan Gordon
(74) *Attorney, Agent, or Firm* — IPro, Inc.; Na Xu

(57) ABSTRACT

A piezoelectric vibrator is used in an electronic device having a screen. The piezoelectric vibrator includes a diaphragm, at least one piezoelectric layer attached to the diaphragm, and a vibrating element extending from the diaphragm for being coupled to a surface of the screen.

4 Claims, 2 Drawing Sheets

PIEZOELECTRIC VIBRATOR AND ELECTRONIC DEVICE USING SAME

FIELD OF THE INVENTION

The present invention generally relates to the art of piezoelectric vibrators, more particularly to a piezoelectric vibrator used in an electronic device having a screen.

RELATED ART OF THE INVENTION

Gradually, piezoelectric vibrators are widely used in many types of electronic devices having screens, such as mobile phones, for providing tactile vibration.

Generally, a piezoelectric vibrator includes a diaphragm, and a pair of piezoelectric layers separately attached to two sides of the diaphragm. In order is to provide vibration to the screen of the electronic device, one end of the piezoelectric vibrator contacts an edge of the screen. However, it is difficult to couple the piezoelectric vibrator with the screen. Even if the piezoelectric vibrator is coupled with the screen, the contacting relationship therebetween is not stable. Further, during the vibration of the vibrator, the screen may be damaged by the contacting end of the piezoelectric vibrator.

Therefore, an improved piezoelectric vibrator that can resolve the problems mentioned-above is desired.

DETAILED DESCRIPTION OF THE EXEMPLARY EMBODIMENT

Reference will now be made to describe one exemplary embodiment of the present invention in detail.

Figure 1:
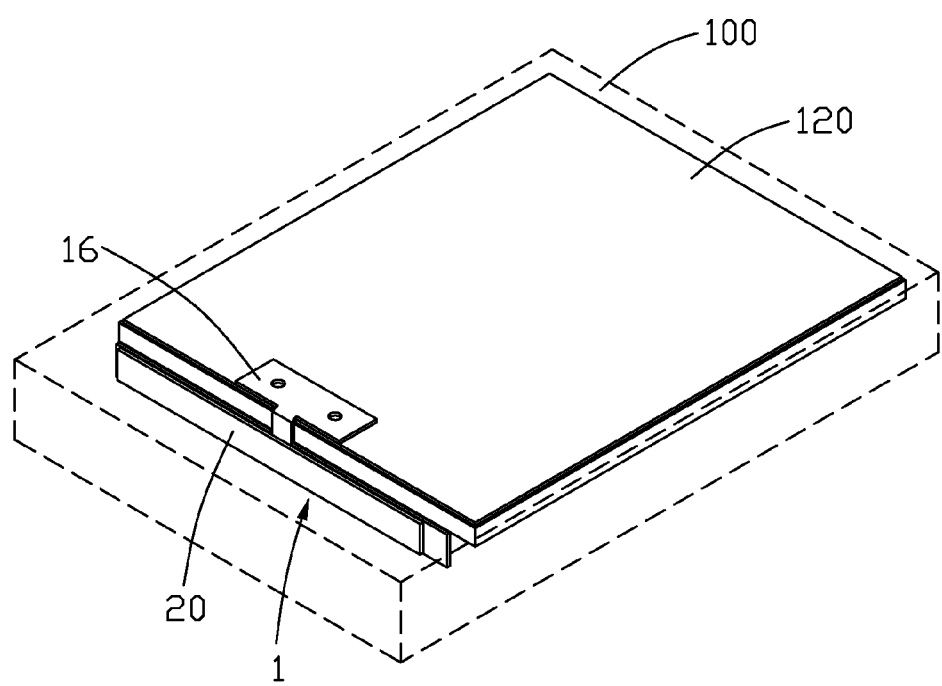
FIG. 1 depicts an assembled view of an electronic device having a piezoelectric vibrator in accordance with one exemplary embodiment of the present invention, and in order to emphasize the piezoelectric vibrator, outlines of the electronic device is illustrated in dashed lines.

Referring to FIG. 1, a piezoelectric vibrator 1, in the exemplary embodiment of the present invention, is mounted in an electronic device 100. The electronic device 100 may be constructed as a mobile phone or other consumer electronic device. The electronic device 100 has a haptic screen 120, and the piezoelectric vibrator 1 is fixed under a bottom of the screen 120.

Figure 2:
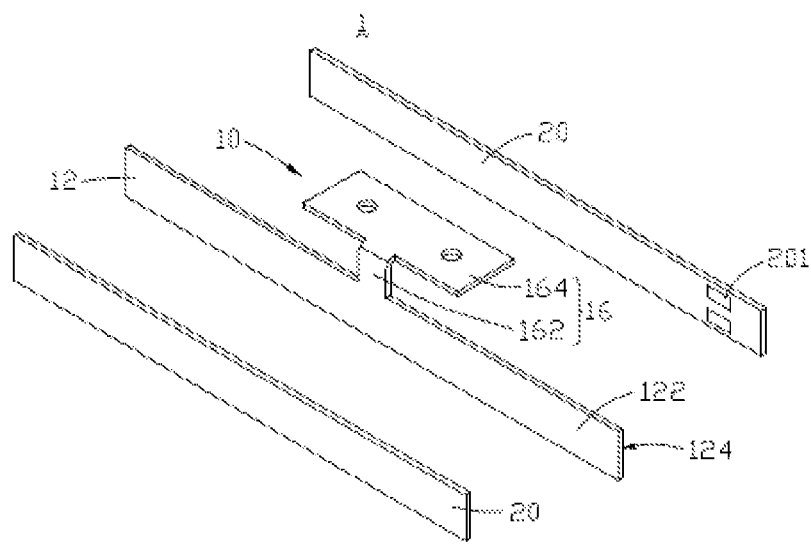
FIG. 2 depicts an isometric exploded view of the piezoelectric vibrator in FIG. 1.
Figure 3:
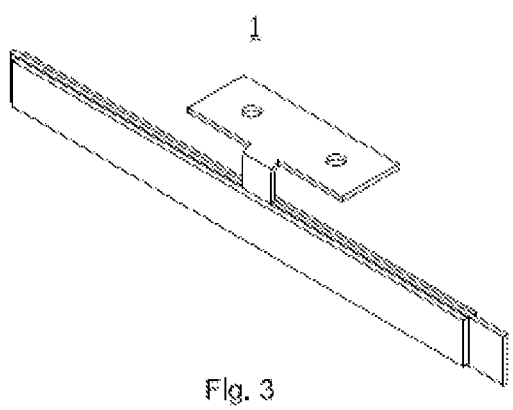
FIG. 3 is an assembled view of the piezoelectric vibrator in FIG. 1.

Referring to FIGS. 2-3, the piezoelectric vibrator 1 includes a diaphragm 10, and two piezoelectric layers 20 attached to the diaphragm 10.

The diaphragm 10 defines a rectangular body 12 including a first surface 122 and a second surface 124 opposite to the first surface 122. The two piezoelectric layers 20 are separately attached to the first surface 122 and second surface 124.

A vibrating element 16 extending from the body 12 is provided. And the vibrating element 16 includes a first portion 162 extending from a central part of the body 12 and a second portion 164 extending vertically from the first portion 162. In the exemplary embodiment, the first portion 162 extends from the central part of the body. However, it can be easily understood that the first portion may extends from other portion of the body. The second portion 164 contacts a surface of the screen 120 for effectively transferring vibration to the screen 120. Furthermore, the first portion 162 is coplanar with the body 12, and the second portion 164 is perpendicular to the first portion 162 and parallel to the screen 120.

The piezoelectric vibrator is a type of electric motor based upon the change in shape of a piezoelectric material when an electric field is applied. Piezoelectric vibrators make use of the converse piezoelectric effect whereby the material produces vibrations in order to produce a motion. In the exemplary embodiment, the two piezoelectric layers 20 are ceramic sintered bodies. And, electrodes 201 are provided between the body 12 of the diaphragm 10 and the two piezoelectric layers 20 for providing electric field to the two piezoelectric layers 20. When an electric field is applied, the two piezoelectric layers 20 make use of the converse piezoelectric effect to produce vibration.

When assembled in the electronic device 100, the piezoelectric vibrator 1 can be assembled to the screen only with one edge thereof fixed to a bottom of the screen 120. And, when electrified, the piezoelectric vibrator 1 vibrates, and the vibrating element 16 directly transfers the vibration to the screen 120, whereby, the screen 120 is activated to vibrate to provide haptic feedbacks.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A piezoelectric vibrator, used in an electronic device having a screen, comprising:
   a diaphragm;
   at least one piezoelectric layer attached to the diaphragm;
   electrodes provided between the diaphragm and the piezoelectric layer for providing electric field to the piezoelectric layer; wherein
   the diaphragm comprises a body and a vibrating element extending from the body; and
   the vibrating element comprises a first portion extending from the body and second portion perpendicular to the first portion for being coupled with the screen.

2. The piezoelectric vibrator as described in claim 1, wherein the piezoelectric layer is made of ceramic material.

3. An electronic device comprising:
   a screen;
   a piezoelectric vibrator coupling to a bottom of the screen and defining a diaphragm, at least one piezoelectric layer attached to the diaphragm;
   electrodes provided between the diaphragm and the piezoelectric layer for providing electric field to the piezoelectric layer; wherein
   the diaphragm comprises a body and a vibrating element extending from the body; and
   the vibrating element comprises a first portion extending from the body and second portion perpendicular to the first portion for being coupled with the screen.

4. The electronic device as described in claim 3, wherein the piezoelectric layer is made of ceramic material.

* * * * *